United States Patent Office 3,672,920
Patented June 27, 1972

3,672,920
OPTICAL GLASS HAVING A HIGH REFRACTIVE INDEX AND A LOW DISPERSION
Hachiro Ishiguri, Tokorozawa, Japan, assignor to Hoya Glass Works, Limited, Tokyo, Japan
Filed May 26, 1970, Ser. No. 40,553
Claims priority, application Japan, May 27, 1969, 44/41,260
Int. Cl. C03c 3/12, 3/14, 3/30
U.S. Cl. 106—47 Q
1 Claim

ABSTRACT OF THE DISCLOSURE

An optical glass having a high refractive index, a low dispersion and a high stability during melting can be produced by adding 5–10 weight percent of MgO to a composition of the $B_2O_3$-$La_2O_3$-$ThO_2$ system optionally containing $SiO_2$, $ZrO_2$ and/or $Ta_2O_5$.

---

The present invention relates to an optical glass suitable for use in lens materials adapted to cameras and other optical apparatuses.

In order to obtain an achromatic lens having a low aberration, there is required a glass having a high refractive index and a low dispersion. However, it is very difficult to produce a glass in the left domain from the line $\overline{BD}$ shown in FIG. 1 which will be explained later. The present invention is directed to an optical glass having a high refractive index and a low dispersion included within the domain surrounded by $\overline{AB}$, $\overline{BD}$, $\overline{DC}$ and $\overline{CA}$ as shown in FIG. 1 wherein A is (1.76, 53.0), B (1.76, 52.0), C (1.70, 56.5) and D (1.70, 55.0) as expressed by co-ordinates of ($\eta_d$, $\nu_d$). The glass of the present invention has no tendency to devitrification and can be produced on a commercially large scale.

In connection with such an optical glass having a high refractive index and a low dispersion, Japanese Patent Publications 4686/56, 2590/67 and U.S. Pat. No. 3,074,805 disclose glasses having their optical properties in the right region from the line $\overline{BD}$. Further, glasses disclosed in Japanese patent publication 3266/63 are also included in the right region from the line $\overline{BD}$. Thus, it is difficult to produce a glass in the left region from the line $\overline{BD}$. Further, Japanese patent publication 11761/68 discloses the production of some glasses having optical properties located mainly in the left region from the line $\overline{BD}$ by employing an appropriate proportion of contents of $B_2O_3$, $La_2O_3$ and $ThO_3$ and selecting a molar ratio satisfying the condition of $(Li_2O+RO)/B_2O_3 < 0.2$. However, these glasses can be hardly said to be sufficiently stable so as not to devitrify.

Generally, this type of glasses have been basically produced by a method in which with the $B_2O_3$-$La_2O_3$ system, $La_2O_3$ is replaced by $ThO_2$, $ZrO_2$ and/or $Ta_2O_5$, and alkali and divalent metal oxides are added to the system. Alkali and divalent metal oxides have a great influence on the stability of this type of glasses. That is, the higher the contents of alkali and divalent metal oxides, the more stable the glass, but the lower the refractive index and Abbe's number, so that the optical properties of the glass will not fall in the domain surrounded by the boundary of ABCD, as is well known. Therefore, it can be said that the conventional glasses have been made on a compromise between the stability and the two optical properties, i.e., refractive index and Abbe's number.

Therefore, an object of the present invention is to provide a glass having a high refractive index and a low dispersion contained in the above-mentioned domain and being markedly stable not to devitrify.

The present invention will be further explained in detail with reference to the accompanying figures in which.

The above object has been found achieved by increasing a solution amount of divalent metal oxides. Although it has been well known that the ternary $B_2O_3$-$La_2O_3$-$ThO_2$ system is most preferably employed as basic glass composition in order to produce a glass having optical properties contained in the above domain, the present inventor have examined in more detail the effects of all the divalent metal oxides to make a solution amount of said oxides higher. As a result, CdO, ZnO and PbO reduce largely Abbe's number, although they increase the refractive index, so that the glass can not fall in the left region from the line $\overline{BD}$. Further, it has been found from the examinations of MgO, CaO, SrO and BaO (BeO is not employed owing to its toxicity) that an amount of the addition thereof should be increased (with the lower content of $B_2O_3$) to cause glass formation as the electronegativity of the divalent ion is higher and that the total amount of $La_2O_3$ and $ThO_2$ soluble into $B_2O_3$ is also higher as the electronegativity of the divalent ion incorporated in the glass is higher. As a result, MgO can be added to the glass in the highest amount and form a glass forming region in which a higher amount of $La_2O_3$ and $ThO_2$ is soluble. Further, when $B_2O_3 \leq 40\%$ by weight, any of CaO, SrO and BaO makes the glass less stable than MgO, so that rather MgO alone as divalent metal oxide is to be used, in other words the $B_2O_3$-MgO-$La_2O_3$-$ThO_2$ system is effective in forming a sufficiently stable glass to be produced on a commercial scale which has optical properties falling within the domain surrounded by ABCD.

Figure 2:
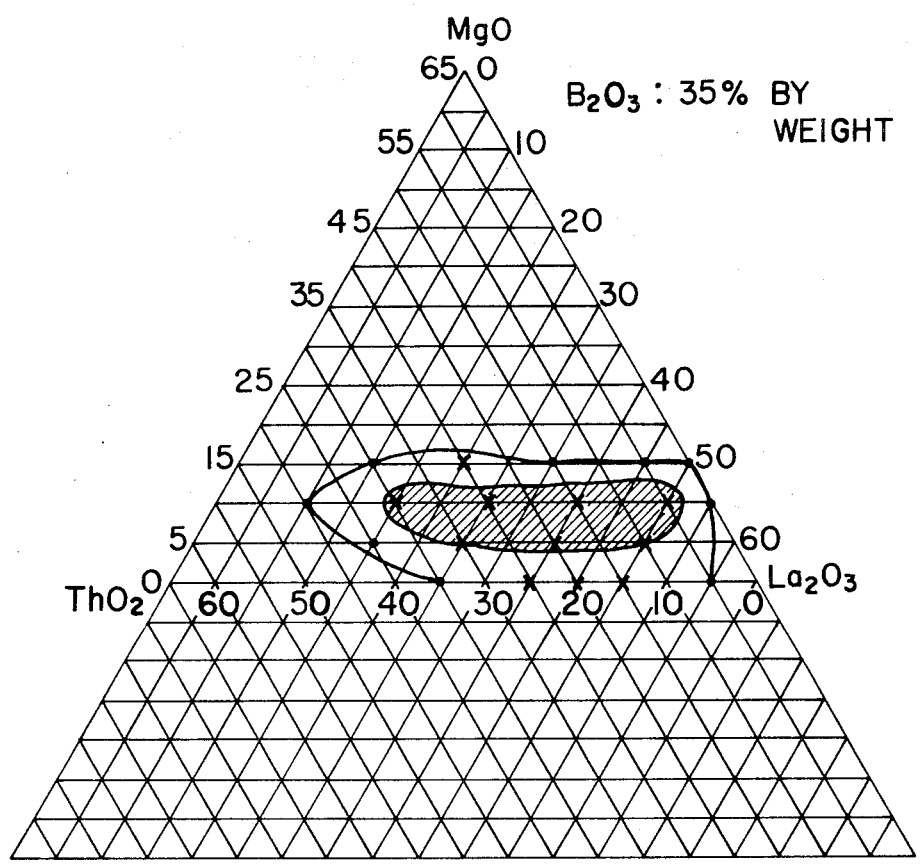
FIG. 2 represents a phase diagram of the MgO-$ThO_2$-$La_2O_3$ system when $B_2O_3$ is of 35% by weight in which a normal glass forming region is surrounded by a larger circle and an extremely stable glass forming region by a smaller shaded circle.

In the $B_2O_3$-MgO-$La_2O_3$-$ThO_2$ system, a glass is formed when $B_2O_3$ is 30–45% by weight and its refractive index is 1.70 or less when $B_2O_3$ is of more than 40% by weight. Referring to FIG. 2, the glass forming range when $B_2O_3$ is of 35% by weight is shown in a larger circle, wherein a mark "x" indicates a sampling composition which could be perfectly vitrified and a mark "·" indicates that which formed a glass with a slight surface devitrification. From the further detailed researches, an extremely stable glass forming range, from which a fully homogeneous glass is produced, even in such a large melting amount as several liters or more, has been found to exist as shown by a smaller shaded domain in FIG. 2.

The present glass obtained in this way consists of 30–40% by weight $B_2O_3$, 5–10% by weight MgO, 20–55% by weight $La_2O_3$ and 2–35% by weight $ThO_2$, wherein the total amount of $La_2O_3$ and $ThO_2$ is in the range of 50–65% by weight.

With less than 30% $B_2O_3$, the tendency to devitrification becomes remarkable and with more than 40%, the refractive index is lower than 1.70. If MgO is outside the above range, the tendency to devitrification is higher. Similarly, if $La_2O_3$ and $ThO_2$ are outside the above ranges respectively, the tendency to devitrification is higher, and the optical properties do not fall within the domain surrounded by ABCD unless the total amount thereof is in the range of 50–65%. By replacing $B_2O_3$ with $SiO_2$ up to 5% by weight, the liquidus temperature is markedly lowered, while by the replacement more than 5% by weight, the optical properties shift unpreferably in the right region from the line BD. Also by replacing a portion of $ThO_2$ with $ZrO_2$ and $Ta_2O_5$, the liquidus temperature can be lowered. However, if the replacing amounts of $ZrO_2$ and $Ta_2O_3$ is more than 3% and 5% respectively, the optical properties shift in the right region from the line BD.

Further, if necessary, refining agents such as $As_2O_3$ and the like may be added to the above composition.

The following examples illustrate the present invention.

EXAMPLES

The glass having compositions indicated in the following table were prepared by a method usually employed for producing ordinary borate glasses. That is, each batch containing a pre-determined amount of the composition was charged into a platinum crucible after sufficiently mixing and fully melted by heating at a temperature of 1,300° C. After stirring with a platinum rod, the melt was kept at the same temperature for one and one half hours to remove bubbles therein. Then, the temperature was lowered to 1,150° C. and again the melt was stirred with the platinum rod. After removing striae in the glass, the temperature was lowered further to 1,000° C. with stirring. Then, the melt was poured on an iron plate preheated at a temperature of 300-400° C. to be solidified and annealed in an electric furnace.

Figure 1:
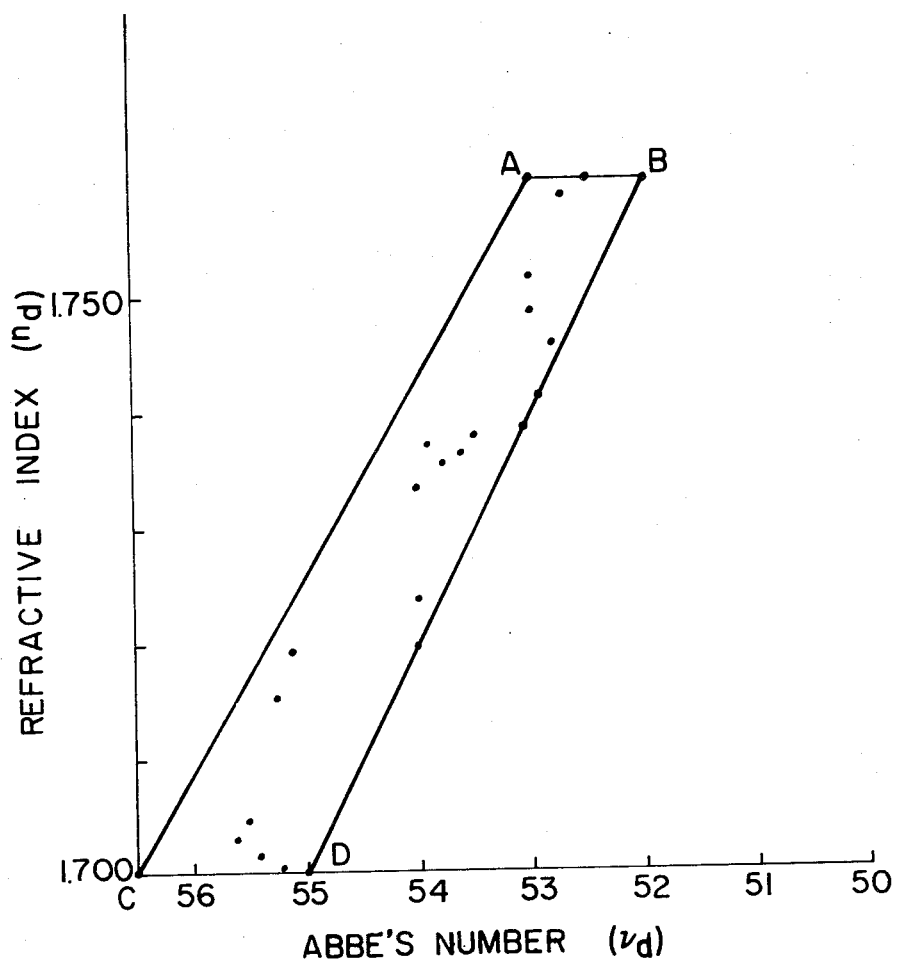
FIG. 1 represents a distribution of optical properties of some glasses produced according to the present invention in rectangular co-ordinates where the ordinate represents refractive index ($\eta_d$) and the abscissa Abbe's number ($\nu_d$).

These glasses had optical properties falling within the domain surrounded by ABCD shown in FIG. 1, and contained such a large amount of dissolved MgO as the molar ratio of $MgO/B_2O_3$ is 0.22-0.43.

The glass according to the present invention has a high refractive index and a low dispersion as indicated in FIG. 1 and also has a high weather-resistance and a good property for grinding. Further it is almost colorless and so stable not to be devitrified that it can be produced on a large commercial scale.

What is claimed is:

1. Optical glass compositions having a high refractive index and low dispersion consisting, on an oxide basis of, by weight, 30-40% $B_2O_3$, 5-10% MgO, 20-55% $La_2O_3$, 2-35% $ThO_2$, 0-5% $SiO_2$ in place of a corresponding weight of $B_2O_3$, 0-3% $ZrO_2$ in place of a corresponding weight of $ThO_2$, and 0-5% $Ta_2O_5$ in place of a corresponding weight of $ThO_2$, the total amount of $La_2O_3$ and $ThO_3$ being 50-65% and having optical characteristics, when plotted with refractive index ($\eta_d$) as the ordinate and Abbe's number ($\nu_d$) as the abscissa, within the rectangular coordinates as shown in FIG. 1 of A (1.76; 53.0), B(1.76; 52.0), C(1.70; 56.5) and D(1.70; 55.0) of the respective $\eta_d$ and $\nu_d$ values.

| Number | $SiO_2$ | $B_2O_3$ | MgO | $La_2O_3$ | $ThO_2$ | $ZrO_2$ | $Ta_2O_5$ | $\eta_d$ | $\nu_d$ |
|---|---|---|---|---|---|---|---|---|---|
| 1 | | 30 | 5 | 30 | 35 | | | 1.75826 | 52.69 |
| 2 | | 30 | 5 | 32 | 33 | | | 1.75977 | 52.50 |
| 3 | 5 | 30 | 5 | 40 | 20 | | | 1.73513 | 52.62 |
| 4 | 3 | 32 | 5 | 40 | 20 | | | 1.73549 | 53.76 |
| 5 | | 35 | 5 | 40 | 20 | | | 1.73699 | 53.91 |
| 6 | | 35 | 5 | 30 | 35 | | | 1.73322 | 53.99 |
| 7 | | 35 | 10 | 40 | 15 | | | 1.72368 | 54.00 |
| 8 | | 35 | 10 | 30 | 25 | | | 1.71923 | 54.02 |
| 9 | | 35 | 10 | 20 | 35 | | | 1.71440 | 54.04 |
| 10 | | 40 | 5 | 53 | 2 | | | 1.71954 | 55.20 |
| 11 | | 40 | 5 | 45 | 10 | | | 1.71504 | 55.25 |
| 12 | | 40 | 10 | 48 | 2 | | | 1.70650 | 55.20 |
| 13 | | 40 | 10 | 40 | 10 | | | 1.70145 | 55.40 |
| 14 | | 34 | 5 | 40 | 19 | | 2 | 1.73811 | 53.52 |
| 15 | | 35 | 5 | 40 | 19 | | 1 | 1.74536 | 52.82 |
| 16 | | 35 | 5 | 40 | 17 | 3 | | 1.74072 | 52.87 |
| 17 | | 35 | 5 | 40 | 17 | | 3 | 1.73827 | 53.10 |
| 18 | | 40 | 8 | 47 | 5 | | | 1.70276 | 55.60 |
| 19 | 2 | 30 | 5 | 30 | 33 | | | 1.74847 | 53.04 |

References Cited

UNITED STATES PATENTS 2,241,249 5/1941 Eberlin et al. 106—47 R
2,434,146 1/1948 De Paolis 106—47 R
3,082,101 3/1963 Geffcken et al. 106—47 Q

FOREIGN PATENTS 615,286 1/1949 Great Britain 106—47 R

TOBIAS E. LEVOW, Primary Examiner

M. L. BELL, Assistant Examiner